July 7, 1942.    G. W. SEARS    2,289,215
TOOL HOLDER FOR LATHES
Filed Oct. 15, 1940    3 Sheets-Sheet 1
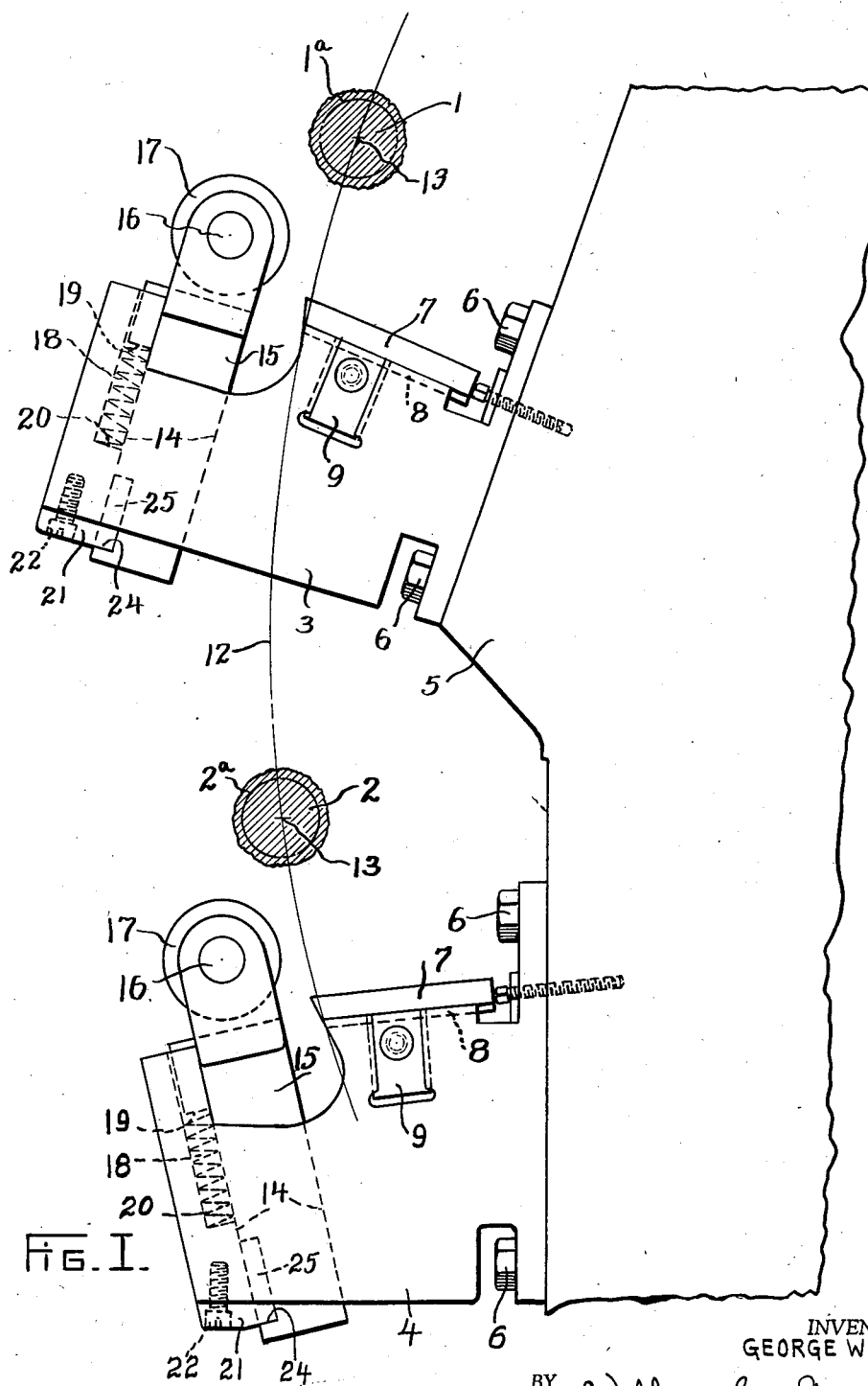
FIG. I.
INVENTOR.
GEORGE W. SEARS
BY Willard L. Groom

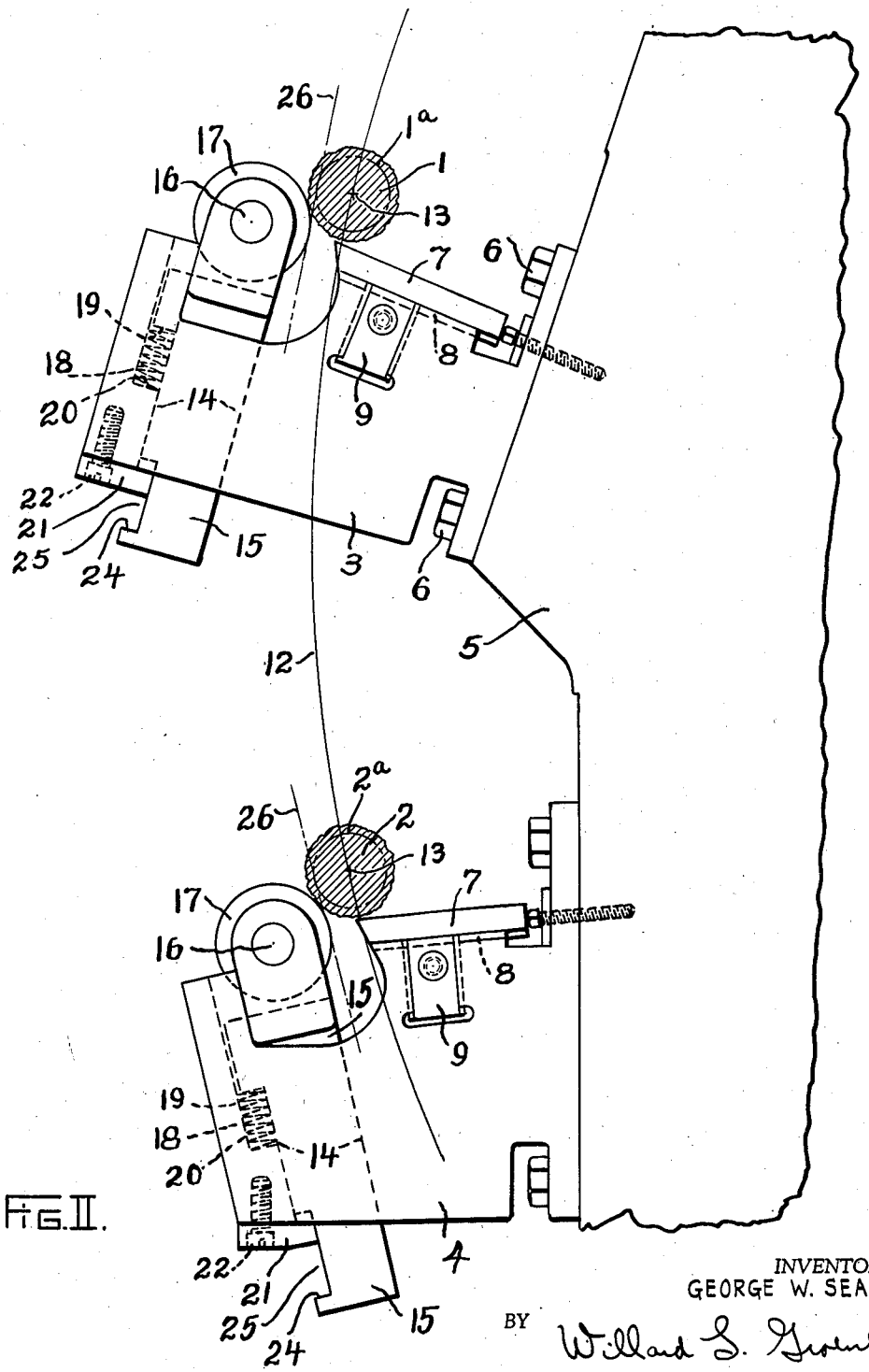

July 7, 1942.   G. W. SEARS   2,289,215
TOOL HOLDER FOR LATHES
Filed Oct. 15, 1940   3 Sheets-Sheet 3
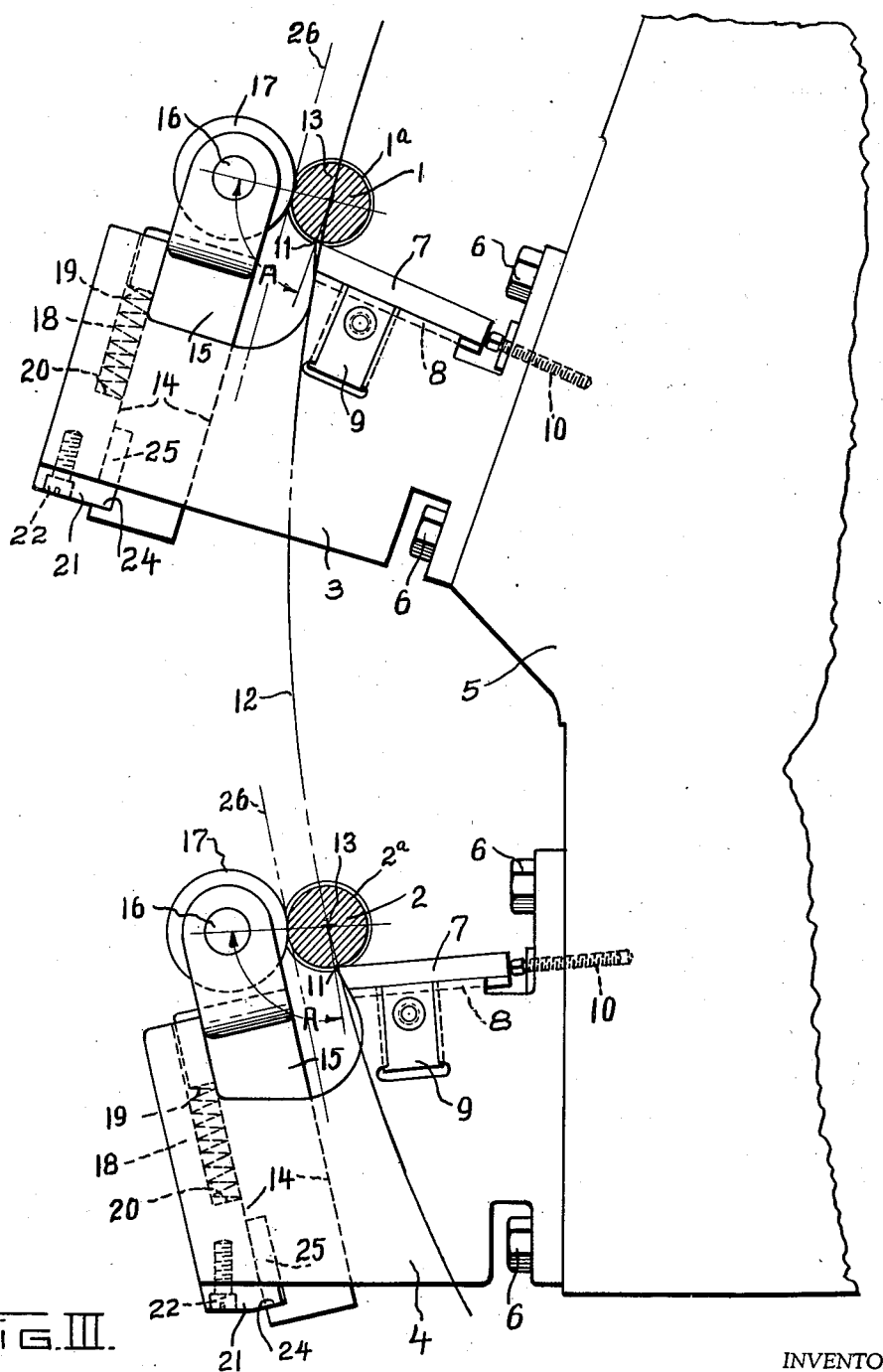
FIG. III.
INVENTOR.
GEORGE W. SEARS
BY *Willard L. Groene*

Patented July 7, 1942

2,289,215

UNITED STATES PATENT OFFICE 2,289,215

TOOL HOLDER FOR LATHES

George W. Sears, Cincinnati, Ohio, assignor to The R. K. Le Blond Machine Tool Company, Cincinnati, Ohio, a corporation of Delaware Application October 15, 1940, Serial No. 361,301

8 Claims. (Cl. 82—35)

This invention pertains to tool holders for lathes and is particularly adapted for use in conjunction with orbital lathes of the multiple spindle type, such for example, as shown in patent of William F. Groene, #2,138,964, dated December 6, 1938, in which a plurality of crankshafts are to have their crank pins simultaneously turned in such a multiple spindle orbital lathe. The object of the present invention is to provide in conjunction with the rigid tool block carrying a cutting tool mounted on the orbital tool carrier, a work supporting roller arrangement automatically operable in conjunction with the cutting tool while being fed to the work, so as to steady and support the crank pins or work piece being turned and to provide automatic means, operating progressively as the work is being turned down to effect the proper steadying of the work in opposition to the distortion which might otherwise be caused in it by the cutting action of the tool on the work.

One of the chief objects therefore of this invention is to provide in a lathe having a tool slide or carrier, means for mounting a cutting tool rigidly on said carrier and to provide a work supporting roller device operating in conjunction with said cutting tool for at all times contacting the work in an opposed relation to the cutting action of the tool and to automatically move into final position on the work surface as it is turned down to finished diameter to prevent distortion of the work during the cutting operation.

Another feature of this invention is to provide in a lathe having a tool carrier, a tool block fixed on said carrier having a cutting tool adapted to be fed in a definite direction to a work piece to be turned in said lathe, and then to provide a work supporting roller device resiliently mounted on said tool carrier having movement in a direction tangent to the work surface being turned and substantially parallel to the direction of feeding of said cutting tool relative to the work and which normally is engaged in yielding contact with the work piece during the cutting action of the cutting tool thereon.

A further feature of this invention is to provide in a multiple spindle orbital lathe having an orbitally moving tool carrier, a series of tool blocks fixed on said carrier, each having a cutting tool adapted to be fed in a definite path of travel relative to the work to be turned and to provide in conjunction with this cutting tool, a resiliently mounted back up roller on the tool block, which is normally urged into contact with the work surface being turned so as to contact it at a position to oppose the cutting action of the cutting tool on this work.

And it is a still further object to so arrange this back up roller so that at the completion of the turning operation, the roller of the back up device will automatically move to a position engaging the work at a point substantially 90° radially removed from the point of contact of the cutting edge of the tool with the work piece.

Further features and advantages of this invention will be described in detail in conjunction with the drawings in which:

Figure I is a fragmentary view of a portion of an orbital tool carrier in an orbital lathe of the type shown in Patent #2,138,964 cited above, showing the application of my unique tool holder and back up roller device to a multiple spindle orbital lathe adapted to the simultaneous machining of a plurality of crank pins on a plurality of crankshafts at one time.

Figure II is a similar fragmentary view of the orbital tool carrier showing the position of the tool holders at the beginning of the cutting action of the cutting tool on the rough outside surface of the work piece with the work supporting roller depressed by engagement with this rough work surface.

Figure III shows the tool holders at the time of completion of the cutting operation on the work with the work supporting rollers moved to their 90° opposite position relative to the cutting edge of the cutting tool and against their stops at the final sizing of the work.

For illustrative purposes, this invention is shown applied to a multiple spindle orbital lathe having work spindles in which is mounted the work having the bearing portions 1 and 2 and it is obvious that this tool holder could as well be applied to any form of lathe in which rotatable work is to be turned. The tool holders 3 and 4 are shown fixed on the orbital tool carrier and feeding member 5 by suitable bolts 6. On each of these tool blocks 3 and 4, are fixed the cutting tools 7 appropriately mounted on dove tail guideways 8 and held in position by suitable clamping means 9 and backed up by the positioning screw 10. The cutting edges of these tools 11 are, in this particular instance, fed in an arcuate path of tool feeding 12 as effected by movement of the tool carrier 5 as fully described in the above mentioned patent, but which line could as well be a straight line of feeding substantially parallel and coincident to the radius connecting the cutting edge of the tool with the axis of rotation 13 of the work being turned.

Slidably mounted, for movement in the direction of the line 26 in the general direction of feeding 12, in suitable guide ways 14 in the tool blocks 3 and 4, is the work supporting member 15 which carries a pin 16 upon which is journaled the work contacting roller 17. A compression spring 18 bearing against the abutment surface 19 formed on the sliding member 15 and against the abutment surface 20 formed in the tool holders 3 and 4 serve to normally urge the member 15 and roller 17 towards the work 1 and 2 being machined in a direction tangent to the work surface being turned (indicated by the line 26) substantially parallel and in the same direction as the direction of feeding of the cutting tool 7.

Also fixed on the tool holders 3 and 4 is an abutment block 21, by suitable screws 22, which normally engages the abutment surface 24 of the slot 25 formed in the sliding member 15 so as to limit the outward movement of this member under the influence of the spring 18.

The operation of this tool holder arrangement is substantially as follows:

With the tool holders 3 and 4 and their tools 7 respectively fully withdrawn from the work, Figure I, at the beginning of the feeding cycle, each of the sliding members 15 are moved upwardly, bringing their abutment surfaces 24 in contact with the abutment block 21 fixed on the tool holders 3 and 4 as yieldingly effected by the compression springs 18. As the tool holders 3 and 4 and tools 7 are fed toward the work along the line of feeding 12, the rollers 17 of the sliding members 15 first engage the rough work surface of the work pieces 1 and 2. Continuous feeding movement of the tool carrier 5 in bringing the cutting edge 11 up to contact with the work surface to be machined, causes the sliding members 15 to be depressed against the compression springs 18 and remove them from contact with the abutment blocks 21 on the tool blocks.

These sliding members 15 with their roller 17 in engagement with the rough work surfaces literally float upon the work piece in a direction tangent to the work, as indicated by the line 26, in the general direction of feeding movement 12 of the cutting tools 7 relative to the work piece, so as to accommodate themselves to the rough irregular work surfaces. Continued feeding of the tool carrier 5 brings the cutting edges 11 of the tool 7 into engagement with the rough work surface, Figure II, whereupon machining operations take place on the surface to reduce them down to the finished work diameter 1a and 2a. As this machining operation takes place by the cutting tool, the roller 17, which is constantly held in yielding contact against the work piece 1 or 2 by the spring 18, gradually advances along the line 26 while in engagement with the work, till it ultimately reaches the position, Figure III, it normally assumes with its abutment surface 24 in contact with the abutment block 21, whereupon the members 15 are again fully extended so that the axis of the roller or pin 16 and the axis of rotation 13 of the work, lie in a plane substantially perpendicular to a plane passing through this axis of rotation 13 of the work and the cutting edge of the tool, as clearly indicated by the angle A.

During this cutting operation of the tool on the work with the roller 17 in contact with the work, the cutting forces set up by the cutting tool are absorbed by the back up of the roller 17 which is positioned at this substantially 90° arrangement indicated by the angle A, particularly during the final stages of heavy cutting so as to provide a complete and efficient support for the work to prevent distortion during the cutting operation.

Thus, in this arrangement is provided a tool carrier which carries a tool rigidly fixed thereon for movement to and from the work in feeding motion and in conjunction with this tool, a floatingly mounted work supporting member which engages the work in such a way that it prevents distortion and movement of the work from its true axis of rotation due to the cutting action of the tool. It is also to be further noted that the floating movement of this back up roller device takes place in a plane tangentially of the work surface being machined and substantially parallel to the direction of feeding of the cutting tool relative to the work piece.

It is also to be noted that this back up roller is arranged to initially engage the work and be depressed away from the work, while yieldingly held in contact with it, during the cutting cycle and at the completion of the cutting cycle, the roller is then automatically positioned with its axis in a plane passing through the axis of rotation of the work which lies substantially perpendicular to a plane passing through the axis of rotation of the work and the cutting edge of the tool. I have therefore provided a tool actuating device capable of carrying a tool on a tool carrier in rigidly mounted position while at the same time providing a floatingly mounted back up roller device, to prevent distortion of the work during the cutting action of the tool upon the work, which is readily adapted to the machining of rough irregular surfaces of any shape and configuration and which is arranged to fully support the work down to and including the point at which the work is brought to final sized dimension.

Having thus fully set forth and described my invention what I claim as new and desire to secure by United States Letters Patent is:

1. In a lathe, a tool feeding carrier, a cutting tool fixed on said carrier adapted to be fed by said carrier relative to a work piece in said lathe, a work support movably mounted on said carrier, and means for yieldingly maintaining said support in contact with a surface being turned on said work piece at a point substantially 90° circumferentially removed from the point of contact of the cutting edge of said tool with said surface.

2. In a lathe, a tool feeding carrier, a cutting tool fixed on said carrier adapted to be fed by said carrier relative to a work piece in said lathe, a work support movably mounted on said carrier for movement in a direction substantially parallel to the direction of relative feeding of said tool, and means for yieldingly maintaining said support in contact with a surface being turned on said work piece at a point substantially 90° circumferentially removed from the point of contact of the cutting edge of said tool with said surface.

3. In a lathe, a tool feeding carrier, a cutting tool fixed on said carrier adapted to be fed by said carrier relative to a work piece in said lathe, a work support associated with said tool comprising a member slidably mounted on said carrier for movement in a direction substantially parallel to the direction of feeding of said tool relative to said work piece, a work engaging portion on said support arranged to contact the surface of said work piece at a point substantially 90° circumferentially removed from the point of contact of the cutting edge of said tool on said work surface, and resilient means for normally urging said support in contact with said work during the cutting action of said tool on said work.

4. In a lathe, a tool feeding carriage, a tool block fixed on said carriage, a tool fixed on said tool block, a work supporting member mounted on said tool block for movement substantially parallel to the direction of feeding of said tool relative to a work piece in said lathe, a work contacting roller journaled on said member, and a spring for resiliently urging said member with its roller in contact with said work and in the same direction as the direction of feeding of said tool to the work.

5. In a lathe, a tool feeding carriage, a tool block fixed on said carriage, a tool fixed on said tool block, a work supporting member mounted on said tool block for movement substantially parallel to the direction of feeding of said tool relative to a work piece in said lathe, a work contacting roller journaled on said member, and means for normally urging said member in the direction of feeding of said tool to said work so that said roller moves substantially tangentially of the work surface to be turned on said work piece.

6. In a lathe, a tool feeding carrier, a tool fixed on said carrier, a work supporting member mounted on said tool block for movement substantially parallel to the direction of feeding of said tool relative to a work piece in said lathe, a work contacting surface on said member adapted to be moved tangentially of the work surface being machined on said work piece, and resilient means for urging said member with its contact surface in contact with said work during the cutting of said tool on said work piece.

7. In a lathe, a tool feeding carrier, a tool holder fixed on said carrier, a cutting tool fixed in said tool holder and movable by said carrier relative to a work piece in said lathe, a work support movably mounted on said tool holder, for movement relative to said carrier and cutting tool, and means for yieldingly maintaining said support in contact with said work piece during the relative feeding movement of said cutting tool and work piece.

8. In a lathe, a tool feeding carrier, a tool holder fixed on said carrier, a cutting tool fixed in said tool holder and adapted to be fed by said carrier relative to a work piece in said lathe, a work support movably mounted on said tool holder for movement in a direction substantially parallel to the direction of relative feeding of said tool and work piece, and means for yieldingly maintaining said support in contact with said work piece during the relative feeding of said cutting tool and said work piece.

GEORGE W. SEARS.